United States Patent [19]
Jansen et al.

[11] Patent Number: 5,605,632
[45] Date of Patent: Feb. 25, 1997

[54] SILVER RECOVERY DEVICE AND PROCESS

[75] Inventors: Benedictus Jansen, Geel; Frank Michiels, Arendonk; Werner Van de Wynckel, Mortsel, all of Belgium

[73] Assignee: Agfa-Gevaert N.V., Mortsel, Belgium

[21] Appl. No.: 517,389

[22] Filed: Aug. 21, 1995

[30] Foreign Application Priority Data

Sep. 5, 1994 [EP] European Pat. Off. .............. 94202530

[51] Int. Cl.$^6$ ..................................................... C02F 1/42
[52] U.S. Cl. ..................... 210/688; 210/282; 210/287; 210/912; 75/417; 75/713
[58] Field of Search .................... 210/688, 687, 210/287, 282, 912; 75/713, 417

[56] References Cited

U.S. PATENT DOCUMENTS

| | | | |
|---|---|---|---|
| 3,254,771 | 6/1966 | Sicard | 210/266 |
| 3,266,628 | 8/1966 | Price | 210/282 |
| 3,517,816 | 6/1970 | Hoppen | 210/282 |
| 4,051,026 | 9/1977 | Cremers et al. | 210/688 |
| 4,190,542 | 2/1980 | Hodgson et al. | 210/282 |
| 4,364,828 | 12/1982 | Ward | 210/232 |
| 4,457,495 | 7/1984 | Eder et al. | 210/688 |
| 4,842,644 | 6/1989 | Senff | 210/912 |
| 4,871,463 | 10/1989 | Taylor et al. | 210/161 |
| 5,004,212 | 4/1991 | Gutierrez | 75/713 |
| 5,133,846 | 7/1992 | DeNiel et al. | 204/194 |
| 5,188,732 | 2/1993 | DeNiel et al. | 210/289 |
| 5,310,629 | 5/1994 | McGuckin et al. | 75/713 |
| 5,439,584 | 8/1995 | Rosenfield | 210/912 |

FOREIGN PATENT DOCUMENTS

| | | |
|---|---|---|
| 0388158 | 9/1990 | European Pat. Off. . |
| 0430323 | 6/1991 | European Pat. Off. . |
| 1348973 | 12/1963 | France . |
| 2286675 | 4/1976 | France . |

Primary Examiner—Cynthia L. Nessler
Attorney, Agent, or Firm—Brumbaugh, Graves, Donohue & Raymond

[57] ABSTRACT

A silver recovery device (30) is described for removing silver from a silver-containing solution. The device (30) comprises an ion-exchange resin bed (34) and a pump (62) for directing the solution through the resin bed (34). The pump (62) is positioned downstream of the resin bed (34) and the resin bed (34) is held within a retaining space (36) of variable dimensions. Higher liquid flow rates are thereby achievable, without fluidization of the resin.

8 Claims, 2 Drawing Sheets

SILVER RECOVERY DEVICE AND PROCESS

FIELD OF THE INVENTION

The present invention relates to a silver recovery device and process for removing silver from a silver-containing solution, and to a processing apparatus for processing photographic material, the apparatus incorporating such a silver recovery device.

BACKGROUND OF THE INVENTION

To recover silver from photographic rinse water, a number of alternative methods have been proposed, including the use of ion-exchange resins. Such resins are sufficiently inexpensive and effective to enable their use to reduce silver levels to meet effluent water regulations.

Ion-exchange can be defined as a reversible exchange of ions between solid (resin) and a liquid (water containing ionized salts). Silver in the rinse water is in the ionized form of silver complexes, such as silver thiosulphate compounds, e.g. $[Ag(S_2O_3)_2]^{3-}$ and $[Ag(S_2O_3)_3]^{5-}$. Conventionally, to recover the silver, a strong base anion exchange resin is used. In this resin, chloride is the mobile ion and it exchanges with the silver thiosulphate to release a chloride ion while capturing the silver complex, e.g. according to the following scheme:

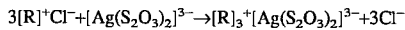

$$3[R]^+Cl^- + [Ag(S_2O_3)_2]^{3-} \rightarrow [R]_3^+[Ag(S_2O_3)_2]^{3-} + 3Cl^-$$

In a known processing apparatus for processing photographic material, the apparatus comprises a plurality of wet treatment stations including a rinsing station, rinse water from the rinsing station being passed to a silver recovery device for removing silver there-from. The silver recovery device comprises an ion-exchange resin bed and a pump for directing the solution upwardly through the resin bed, the pump being located between the rinsing station and the silver recovery device.

Thus, for example, in U.S. Pat. No. 5,133,846 (Agfa Gevaert N.V.) there is disclosed a silver recovery device for recovering silver from rinse water from a photographic sheet film processor by means of a fluidized bed of ion-exchange resin.

There exists a phenomena which is referred to herein as "preferential channel formation" which means that liquid does not flow at equal velocities at all points of a cross-sectional area of an ion-exchange bed but, on the contrary, flows at substantially increased velocities at local cross-sectional zones in the form of tiny sub-currents seeking an easy way through the resin bed. The contact time between the liquid and the resin is correspondingly reduced so that the capacity of the device decreases. Also, a fluidized bed allows resin particles at the bottom of the bed to move upwardly and remain, at least for some time, at the top of the bed. Since such resin particles are heavily loaded with silver because of their former presence at the bottom of the bed, silver is likely to become desorbed by water leaving the device. For these reasons, fluidisation of the resin bed is to be avoided.

In a device having a resin bed cross-sectional area of 100 $cm^2$, a liquid flow rate of 0.5 cm/min, equivalent to a through-put of 50 ml/min is possible. If it is desired to increase the throughput, for example by driving the pump to deliver 500 ml/min, preferential channel formation and fluidization of the resin bed results.

It has been proposed to provide a liquid buffer station between the rinsing station and the resin bed, to assist in the control of liquid flow rate through the silver recovery device, in particular to maintain the linear velocity of rinse water through the resin bed below 0.5 cm/min. While such an arrangement works satisfactorily, a large buffer station places high demands on space.

SUMMARY OF THE INVENTION

It is an object of the present invention to provide a silver recovery device in which the above mentioned disadvantages of preferential channel formation and fluidization of the bed can be avoided, enabling such a device to be operating at liquid through-put higher than hitherto.

We have discovered that this objective can be achieved by positioning of the pump downstream of the resin bed while the resin bed is held within a retaining space of variable dimensions.

Thus, according to a first aspect of the invention there is provided a silver recovery device for removing silver from a silver-containing solution, the device comprising an ion-exchange resin bed and a pump for directing the solution through the resin bed, characterized in that the pump is positioned downstream of the resin bed and the resin bed is held within a retaining space of variable dimensions.

In use, the under-pressure generated by the pump, now positioned downstream of the resin bed, causes the retaining space to contract to immobilise the resin bed. In this manner the possibility of preferential channel formation and fluidization of the bed are reduced. As the pump is operated to generate a higher liquid through-put, the under-pressure increases, further contracting the resin retaining space to further immobilise the resin.

The resin bed is preferably positioned such that the silver-containing solution passes upwards there-through.

Furthermore, by positioning of the pump downstream of the resin bed, air exhaustion of the bed is improved. Since the resin bed itself acts as a filter removing any particulate material from the silver-containing solution, there is less of a need to provide a fine filter to protect the pump, a coarse filter positioned upstream of the resin bed being sufficient. The absence of such a fine filter reduces the resistance to liquid flow.

The invention also provides a processing apparatus for processing photographic material, the apparatus comprising a plurality of wet treatment stations including a rinsing station, rinse water from the rinsing station being passed to the silver recovery device for removing silver there-from. A buffer station may be provided between the rinsing station and the silver recovery device. It is an advantage of the present invention however that a buffer station of smaller capacity than hitherto may be used. Depending on the throughput demands, the buffer station may be dispensed with, since the rinsing station may act as a sufficient buffer. Means may be provided to deactivate the pump when the supply of solution ceases, for example by providing a liquid level sensor in the buffer station or by arranging for the pump to be switched off automatically when the processing apparatus is switched off. Preferably the liquid level in the buffer station in the stand-by condition of the apparatus is below the level of the resin bed to generate a hydrostatic negative pressure in the resin bed.

In a preferred embodiment of the invention, the dimensions of the resin retaining space are variable in response to the flow rate of liquid passing there-through. This may be achieved where the resin bed is held within a cell having a top wall, a bottom wall and at least one movable side wall. The cell may be generally cylindrical, the side wall of the cell being comprised of a flexible sheet material, such as polyethylene, reinforced polyethylene, polyester and other impermeable sheet materials. A cylindrical cross-section is preferred since this form will cause least problems with occasional stagnation of resin in corner spaces or the like.

The cell preferably further includes an upper resin restrainer delimiting the upper level of the resin bed and a lower resin restrainer delimiting the lower level of the resin bed, the side wall of the cell comprising a flexible portion located between the upper and lower resin bed levels. The lower restrainer also acts as a partial filter, removing particulate material such as gelatin which might otherwise clog the ion-exchange resin. The lower resin restrainer may be fixed in position, for example by being secured to the side walls of the cell. The upper resin restrainer may be likewise fixed in position or alternatively may be movable within the cell, being biased downwardly against the upper surface of the resin bed. This bias may be provided by the inherent mass of the restrainer, by an additional weight located thereon, by a spring acting between the top wall of the cell and the restrainer or by any other suitable means. We prefer that the bottom wall of the cell is provided with a liquid inlet, and the top wall is provided with a liquid outlet which is connected to the pump.

The cell may be in the form of a removable cartridge which may be removably inserted in the recovery device and remain there until it has become used and muse be replaced by a new one. Once a used cartridge has been removed, the ion-exchange resin can be regenerated, enabling the cartridge to be re-used. Regeneration may be carried out by placing a cartridge containing used resin in another housing wherein a liquid flow is sustained that can regenerate the resin. This liquid flow may suitably be the fixing liquid of the processing apparatus.

According to a second aspect of the invention there is provided a process for removing silver from a silver-containing solution, comprising the use of a pump to direct the solution through an ion-exchange resin bed, characterized in that the pump is positioned downstream of the resin bed and the resin bed is held within a retaining space of variable dimensions. The process is preferably carried out in such a manner that the dimensions of the retaining space are varied, in relation to the flow rate of liquid there-through, in such a manner as to restrain fluidisation of the resin. The absence of a fluidized bed allows the device to be filled with resin up to a higher degree. The flow rate of liquid through the resin bed may be from 0.5 to 50 cm/min. Such velocities stand for the average velocity of liquid through the resin bed, calculated by dividing the volume rate of liquid flow by the cross-sectional area of the resin bed.

BRIEF DESCRIPTION OF THE DRAWINGS

The invention will now be further described, purely by way of example, by reference to the accompanying drawings in which.

DETAILED DESCRIPTION OF PREFERRED EMBODIMENTS

Figure 1:
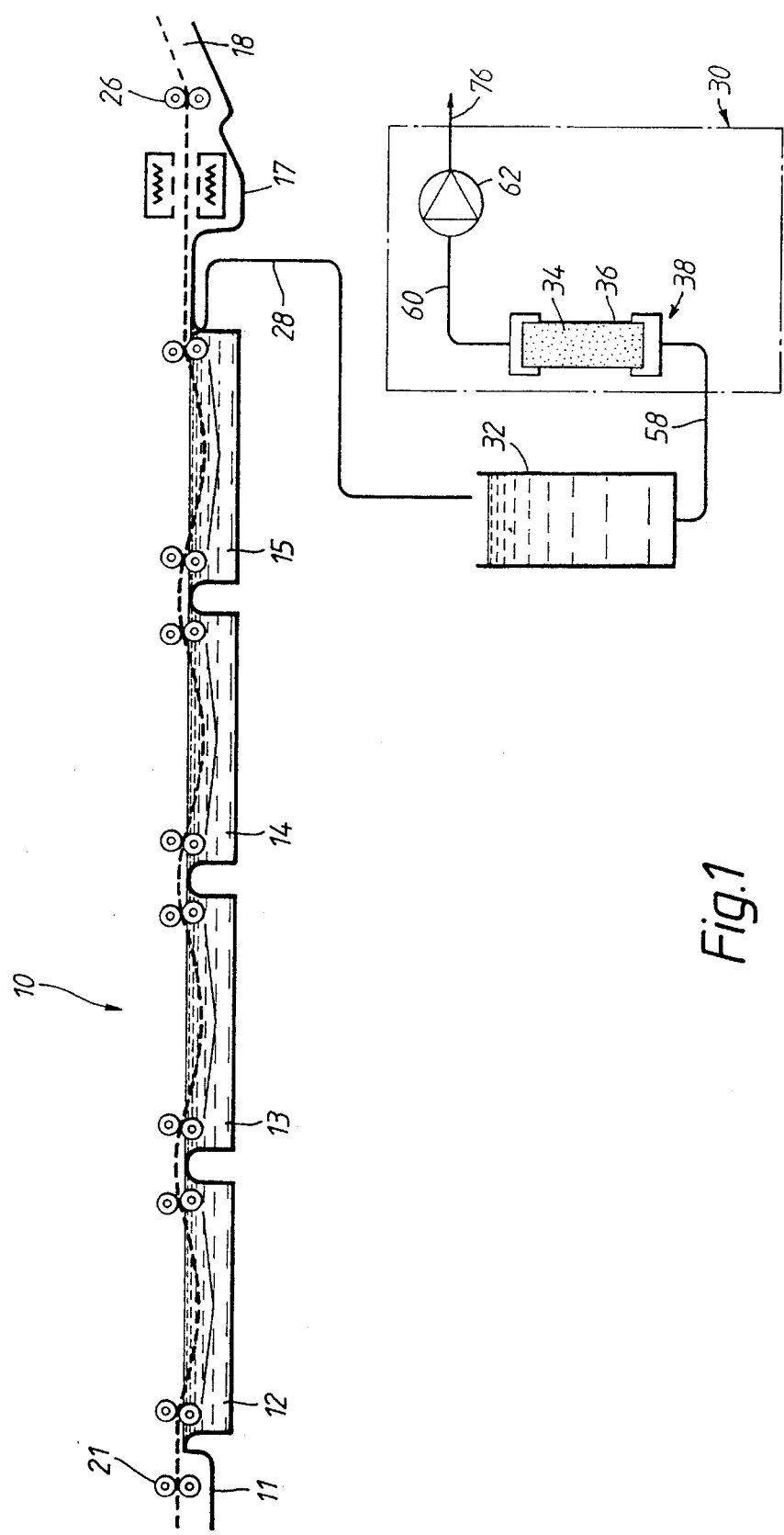
FIG. 1 is a schematic longitudinal layout of a embodiment of a processing apparatus including a silver recovery device according to the invention.

As shown in FIG. 1 a processing apparatus 10 for processing photographic material comprises a sheet feed means 11, in the form of a pair of feeding rollers 21, a developing station 12, a fixing station 13, a wash station 14, a rinsing station 15, a drying station 17 in which wet sheet material comes into contact with heated drying air, and an output station 18 with output rollers 26. Regeneration systems (not shown) are provided for adding regeneration liquid to the developer and the fixer as these processing liquids are consumed. The level control in the different stations occurs by means of overflow. The developing and fixing stations 12, 13 further comprise heating and pump means. The fixing station 13 may be in communication with a device for electrolytically recovering silver from the fixer liquid.

The rinsing station 15 has an overflow 28 leading towards a silver recovery device 30 for removing silver there-from so that this may be discharged in an ecologically acceptable way to the sewer. A buffer reservoir 32, is positioned between the rinsing station 15 and the silver recovery device 30. The silver recovery device 30 comprises an ion-exchange resin bed 34 held within a polypropylene cartridge 36 located within a cell 38.

Figure 2:
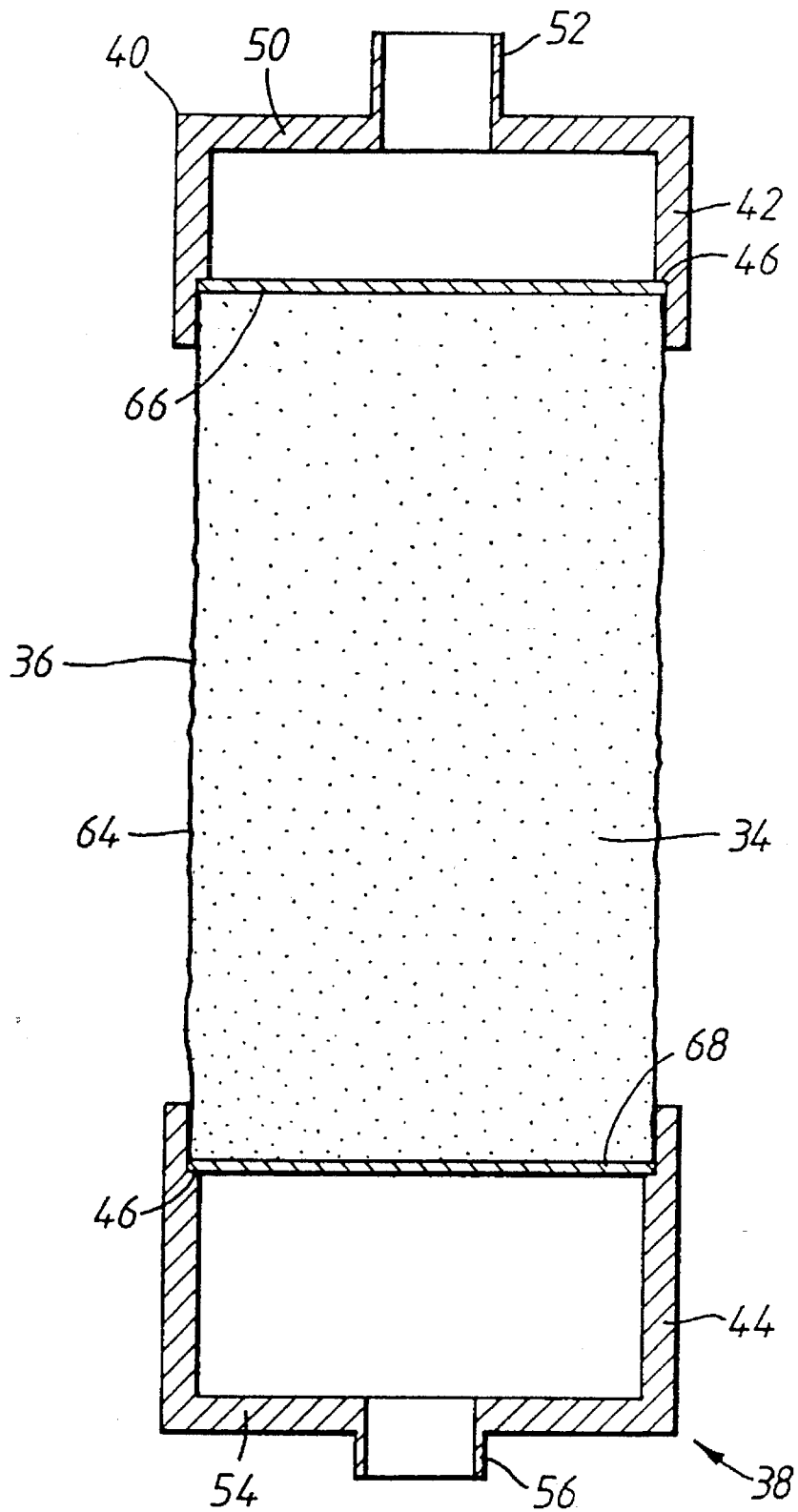
FIG. 2 is a longitudinal cross-section of the resin cell of the silver recovery device shown in FIG. 1.

Referring to FIG. 2, the cell 38 is generally cylindrical and comprises a housing 40 in two parts 42, 44, between which is located the resin cartridge 36 constituting a retaining space for the resin bed 34. The upper housing part 42 includes a shoulder 46 against which the upper end of the cartridge 36 is located. The lower housing part 44 is similarly constructed to accommodate the lower end of the cartridge 36. The cartridge 36 is releasably secured to the upper and lower housing parts 42, 44 by means not shown. The housing parts 42, 44, as well as other constituent parts of the cartridge 36 are made of rigid plastics by injection molding and jointed by adhesive or ultrasonic welding.

The upper part 42 of the housing 40 includes a top wall 50, provided with a liquid outlet connection in the form of an outlet pipe 52. The lower part 44 of the housing 40 includes a bottom wall 54, provided with a liquid inlet connection in the form of an inlet pipe 56. Both connections are arranged for coupling to a respective flexible hose with a hose clip, the inlet connection 56 being coupled to a hose 58 leading from the buffer reservoir 32 and the outlet connection 52 being coupled to a hose 60 leading to a pump 62.

The side wall 64 of the cartridge 36 is formed of polyethylene sheet material. Upper and lower liquid permeable resin restrainers 66, 68 located within the cartridge 36 delimit upper and lower levels of the resin bed 34.

The pump 62 is positioned downstream of the resin bed 34. The pump 62 directs the water to be treated upwardly through the ion-exchange resin bed 34, ensuring that the resin is fully wetted and air is exhausted from the bed 34. The under-pressure generated by the pump 62, causes the flexible side wall 64 of the cartridge 36 to contract the retaining space to immobilize the resin bed 34. In this manner the possibilities of preferential channel formation and fluidisation of the bed 34 are reduced. Rinsing water from the rinsing station 15 is now allowed to enter the buffer reservoir 32. If the pump 62 is operated to generate a higher liquid through-put, the under-pressure increases, further contracting the resin retaining space to further immobilise the resin. Water leaving the pump 62 flows through a conduit 76 to the sewer or to a next recovery device 30 if two or more such devices are provided in series.

EXAMPLE 1

A device as described above was used. The dimensions and other characteristics of the process were as follows.

| | |
|---|---|
| Buffer reservoir capacity | 200 l |
| Resin | LEWATIT ™ M500MB (ex Bayer AG, Germany) |
| Cartridge at rest volume | 3.0 l |
| Resin volume | 2.85 l |
| Pump | Masterflex ™ hose pump |
| Pump capacity | 0 to 500 ml/min |
| Flow rate through resin bed | 3 cm/min |

The buffer reservoir was filled with artificial wash water containing 400 ppm silver. Resin is considered charged and has to be changed when the silver concentration at the outlet exceeds 1 ppm.

Two tests were carried out, one with the pump positioned upstream of the resin bed (reference) and one with the pump positioned downstream of the resin bed (according to the invention ).

With the pump positioned upstream of the resin, fluidization of the resin was observed with flow rates above 100 ml/min. At the start of the test (500 ml/min) the silver content of the incoming water was reduced from 400 ppm to about 100 ppm, which is significantly higher than most effluent regulations allow (typically <1 ppm). When the pump is placed downstream of the resin bed, the flexible container shrinks and no fluidization of the resin occurs. The silver level in the wash water drops from 400 ppm at the inlet to <0.05 ppm at the outlet. The resin can take up more than 180 g silver before the silver concentration at the outlet exceeds 1 ppm, making it necessary to change the resin cartridge.

EXAMPLE 2

In this example a buffer tank with a capacity of 28 l and the resin container described above are connected to a Curix™ film processor which develops Curix™ and ORTHO HTU™ sheet film materials. Wash water from the processor overflows at 1 l/min to the buffer tank. In this case the pump used is a GORMAN-RUPP™ INDUSTRIES pump with a flow rate of 500 ml/min. The flow rate through the resin bed was 3 cm/min.

The sheet film material was processed through the processor at a rate of 30 or 40 $m^2$/day. the silver concentration of the wash water entering the resin bed varies between 75 and 110 ppm.

With the pump positioned downstream of the resin bed, the silver concentration at the inlet of the resin bed was initially 97 ppm. The corresponding silver concentration at the outlet was <0.05 ppm. More than 1000 $m^2$ film could be processed before the silver concentration at the outlet exceeded 1 ppm, making it necessary to change the resin cartridge.

We claim:

1. A process for removing silver from a silver-containing solution, comprising:

using a pump to direct the solution through an ion-exchange resin bed, with the pump being positioned downstream of the resin bed, the resin bed being held within a retaining space of variable dimension, and the dimension being variable in response to flow rate of liquid passing through the resin bed so as to restrain fluidization of the resin.

2. The process of claim 1, wherein the flow rate of liquid through the resin bed is from 0.5 to 5 cm/min.

3. A silver recovery device for removing silver from a silver-containing solution, comprising an ion-exchange resin bed disposed within a retaining space, and a pump means for directing a flow of the solution through the resin bed, wherein:

the pump means is positioned downstream of the resin bed, and a dimension of the retaining space is variable in response to flow rate of liquid passing through the resin bed.

4. The device of claim 3, wherein the resin bed is disposed between a bottom wall which has a liquid inlet, and a top wall which has a liquid outlet which is connected to the pump means.

5. The device of claim 3, wherein the resin bed is held within the retaining space by a cell having a top wall, a bottom wall, and at least one movable side wall.

6. The device of claim 5, wherein the cell is generally cylindrical, and wherein the side wall of the cell comprises a flexible material.

7. The device of claim 6, wherein the cell further includes an upper resin restrainer delimiting an upper level of the resin bed, and a lower resin restrainer delimiting a lower level of the resin bed, and wherein the side wall of the cell further comprises a flexible portion located between the upper and lower bed levels.

8. An apparatus for processing photographic material, comprising a plurality of wet treatment stations including a rinsing station comprising a silver recovery device for removing silver from rinsing water, and wherein the silver recovery device comprises an ion-exchange resin bed and a pump for directing the rinse water through the resin bed, the pump being positioned downstream of the resin bed, the resin bed being held within a retaining space of variable dimension, and the dimension being variable in response to flow rate of liquid passing through the resin bed.

* * * * *

UNITED STATES PATENT AND TRADEMARK OFFICE
CERTIFICATE OF CORRECTION

PATENT NO. : 5,605,632
DATED : February 25, 1997
INVENTOR(S) : Jansen et al.

It is certified that error appears in the above-indentified patent and that said Letters Patent is hereby corrected as shown below:

Column 3, line 29, "muse" should read --must--;

Column 6, line 36, "claim 6" should read --claim 5--.

Signed and Sealed this

Seventh Day of October, 1997

Attest:

BRUCE LEHMAN

Attesting Officer

Commissioner of Patents and Trademarks